(12) United States Patent
Knappe et al.

(10) Patent No.: US 12,188,284 B2
(45) Date of Patent: Jan. 7, 2025

(54) COMPARTMENT ACTUATOR FOR POWER CINCHING

(71) Applicant: Inteva Products, LLC, Troy, MI (US)

(72) Inventors: Tim Knappe, Wermelskirchen (DE); Frank Heigel, Wuppertal (DE); Stefan Wiepen, Schwerte (DE); Niklas Kock, Sprockhovel (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 1115 days.

(21) Appl. No.: 16/186,210

(22) Filed: Nov. 9, 2018

(65) Prior Publication Data
US 2019/0153766 A1    May 23, 2019

(30) Foreign Application Priority Data
Nov. 20, 2017  (DE) .......................... 202017107026.3

(51) Int. Cl.
| | |
|---|---|
| E05B 17/00 | (2006.01) |
| B60R 7/06 | (2006.01) |
| E05B 63/24 | (2006.01) |
| E05B 81/04 | (2014.01) |
| E05B 81/06 | (2014.01) |

(Continued)

(52) U.S. Cl.
CPC .............. *E05F 15/611* (2015.01); *B60R 7/06* (2013.01); *E05B 17/0029* (2013.01); *E05B 63/24* (2013.01); *E05B 81/05* (2013.01); *E05B 81/06* (2013.01); *E05B 81/20* (2013.01); *E05B 81/34* (2013.01); *E05B 81/44* (2013.01); *E05B 83/30* (2013.01); *F16H 19/08* (2013.01); *B60R 7/04* (2013.01); *E05Y 2900/538* (2013.01)

(58) Field of Classification Search
CPC ...... E05B 17/0029; F16H 19/09; F16H 19/08; Y10T 292/108; Y10T 292/308; Y10S 292/11
See application file for complete search history.

(56) References Cited

U.S. PATENT DOCUMENTS

| | | | |
|---|---|---|---|
| 680,814 A | 8/1901 | Smith | |
| 4,518,181 A * | 5/1985 | Yamada | E05B 81/34 292/201 |

(Continued)

FOREIGN PATENT DOCUMENTS

| | | |
|---|---|---|
| CN | 103003102 A | 3/2013 |
| CN | 104019202 A | 9/2014 |

(Continued)

OTHER PUBLICATIONS

Chinese Office Action; International Application No. 201811381675. X; International Filing Date: Nov. 19, 2018; Date of Mailing: Jun. 19, 2020; 5 pages.

(Continued)

*Primary Examiner* — Charles A Fox
*Assistant Examiner* — Gregory T Prather
(74) *Attorney, Agent, or Firm* — CANTOR COLBURN LLP (57) ABSTRACT

A compartment actuator (20) includes a motor (22) and a drive gear (32) driven by the motor (22) about an axis of rotation between a first position and a second position. The drive gear (32) has a groove (36) formed therein and the groove (36) is eccentric about the axis of rotation.

13 Claims, 8 Drawing Sheets

(51) Int. Cl.
*E05B 81/20* (2014.01)
*E05B 81/34* (2014.01)
*E05B 81/44* (2014.01)
*E05B 83/30* (2014.01)
*E05F 15/611* (2015.01)
*F16H 19/08* (2006.01)
*B60R 7/04* (2006.01)

(56) References Cited

U.S. PATENT DOCUMENTS

| | | | | |
|---|---|---|---|---|
| 4,926,707 | A * | 5/1990 | Yamada | E05B 81/06 |
| | | | | 292/201 |
| 5,029,915 | A * | 7/1991 | Wilkes | E05B 81/16 |
| | | | | 70/264 |
| 5,443,292 | A * | 8/1995 | Shimada | E05B 83/16 |
| | | | | 292/216 |
| 6,575,504 | B2 * | 6/2003 | Roatis | E05B 17/0029 |
| | | | | 292/201 |
| 6,802,155 | B1 * | 10/2004 | Kawabata | F25D 23/028 |
| | | | | 49/192 |
| 6,889,571 | B2 * | 5/2005 | Kalsi | E05B 81/25 |
| | | | | 292/201 |
| 11,473,344 | B2 * | 10/2022 | Inan | E05B 81/14 |
| 2002/0060457 | A1 * | 5/2002 | Roatis | E05B 17/0029 |
| | | | | 292/199 |
| 2003/0127866 | A1 * | 7/2003 | Martinez | E05B 17/0029 |
| | | | | 292/216 |
| 2010/0264677 | A1 * | 10/2010 | Denison | E05B 17/0029 |
| | | | | 292/341.16 |
| 2016/0356059 | A1 * | 12/2016 | Newman | E05C 3/046 |
| 2020/0270924 | A1 * | 8/2020 | Principe | E05F 1/1253 |

FOREIGN PATENT DOCUMENTS

| | | |
|---|---|---|
| CN | 210033066 U | 2/2020 |
| JP | S598550 A | 1/1984 |

OTHER PUBLICATIONS

Second Chinese Office Action; Chinese Application No. 201811381675. X; Date of Mailing: Apr. 19, 2021; 7 pages.

Third Chinese Office Action; Chinese Application No. 201811381675. X; Date: Nov. 18, 2021; 6 pages.

* cited by examiner

COMPARTMENT ACTUATOR FOR POWER CINCHING

CROSS-REFERENCE TO RELATED APPLICATIONS

This application claims the benefit of Germany Application No. 202017107026.3, filed Nov. 20, 2017, which is incorporated herein by reference in its entirety.

TECHNICAL FIELD

Exemplary embodiments of the present disclosure relative to door and movable panel latches, and more particularly to any compartment door or lid for vehicles.

BACKGROUND

Conventionally, closing a storage compartment, tray or box is performed by a purely manual operation. A supported operation for closing the door or panel will allow more freedom in the styling and design of the compartment system. Value impression is significantly increased by the automatic cinching.

SUMMARY OF THE INVENTION

According to an embodiment, a compartment actuator includes a motor and a drive gear driven by the motor about an axis of rotation between a first position and a second position. The drive gear has a groove formed therein and the groove is eccentric about the axis of rotation.

In addition to one or more of the features described above, or as an alternative, in further embodiments as the drive gear rotates between the first position and the second position, a pawl receivable within the groove translates along an axis relative to the drive gear.

In addition to one or more of the features described above, or as an alternative, in further embodiments the axis is substantially perpendicular to the axis of rotation of the drive gear.

In addition to one or more of the features described above, or as an alternative, in further embodiments as the drive gear rotates from the first position to the second position, the pawl translates inwardly toward a center of the drive gear.

In addition to one or more of the features described above, or as an alternative, in further embodiments the pawl translates about up to 20 mm.

In addition to one or more of the features described above, or as an alternative, in further embodiments the groove includes at least one ramp-like surface for opposing a biasing force acting on the pawl.

In addition to one or more of the features described above, or as an alternative, in further embodiments comprising a switch for communicating with the motor and a feature extending from the drive gear. The feature engages and activates the switch as the drive gear rotates between the first position and the second position.

In addition to one or more of the features described above, or as an alternative, in further embodiments the feature does not engage the switch when the drive gear is in the first position and the second position.

In addition to one or more of the features described above, or as an alternative, in further embodiments comprising an activator pin coupled to the drive gear. The activator pin and the switch are aligned when the drive gear is in the first position. The activator pin is operable to activate the switch when a pawl is received within the groove.

In addition to one or more of the features described above, or as an alternative, in further embodiments comprising a secondary switch for communicating to the motor a signal to rotate the drive gear from the second position to the first position. The secondary switch is located remotely from the compartment actuator.

In addition to one or more of the features described above, or as an alternative, in further embodiments the first position of the drive gear is associated with a partially closed position of a glovebox and the second position of the drive gear is associated with a fully closed position of the glovebox.

In addition to one or more of the features described above, or as an alternative, in further embodiments the drive gear is rotatable between a first position and a second position in a first direction about the axis of rotation.

In addition to one or more of the features described above, or as an alternative, in further embodiments the drive gear is rotatable from a second position to a first position in the first direction and a second opposite direction about the axis of rotation.

In addition to one or more of the features described above, or as an alternative, in further embodiments the drive gear is rotatable in the second direction about the axis of rotation in response to a failure of the actuator.

According to another embodiment, a method of operating a compartment includes manually rotating a compartment door to a partially closed position relative housing, activating a switch of a compartment actuator, and automatically cinching the compartment door closed using the compartment actuator in response to activating the switch.

In addition to one or more of the features described above, or as an alternative, in further embodiments manually rotating the compartment door to the partially closed position causes a pawl extending from the compartment door to be received within an eccentric groove of a drive gear of a compartment actuator.

In addition to one or more of the features described above, or as an alternative, in further embodiments automatically cinching the compartment door closed includes rotating the drive gear of the compartment actuator about an axis of rotation such that the pawl translates along an axis relative to the drive gear.

In addition to one or more of the features described above, or as an alternative, in further embodiments the axis is substantially perpendicular to the axis of rotation of the drive gear.

In addition to one or more of the features described above, or as an alternative, in further embodiments comprising deactivating the switch to stop rotation of the drive gear about the axis of rotation.

In addition to one or more of the features described above, or as an alternative, in further embodiments comprising receiving a signal from another switch located remotely from the compartment actuator and automatically opening the compartment door relative to the housing in response to the signal.

According to yet another embodiment, an automated cinching system includes a compartment door manually movable to a pre-closed position. The compartment door is movable from the pre-closed position to a fully closed position automatically by moveable parts located in a compartment housing. The movable parts cooperate with a mechanical closing feature of the door to pull the compartment door to the fully closed position.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

DETAILED DESCRIPTION

Figure 1:
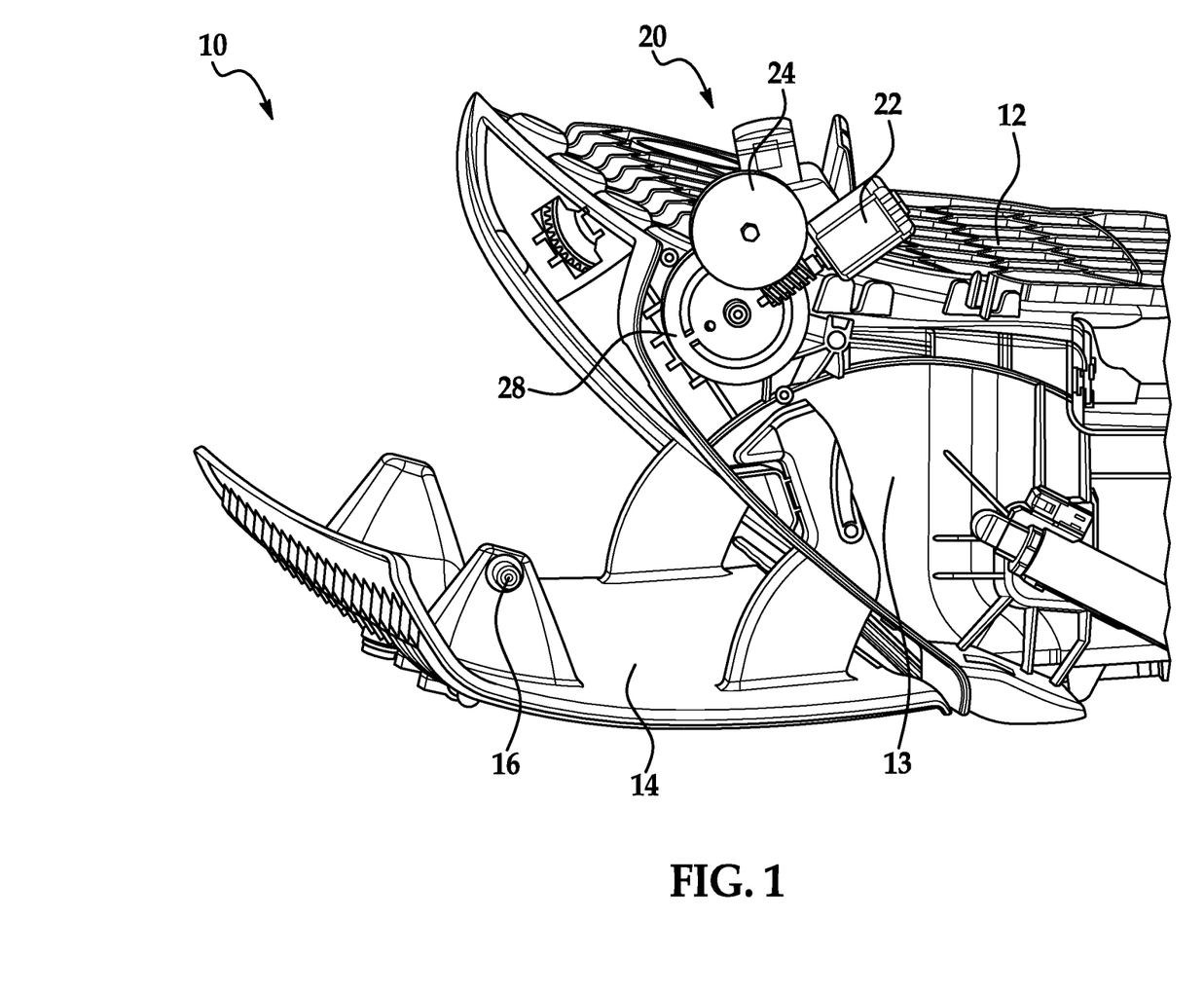
FIG. 1 is a perspective view of a compartment system assembly in an open configuration according to an embodiment.

Referring now to FIG. 1, an example of a compartment, such as a glove box assembly 10 is illustrated. This assembly 10 includes a housing 12 having a generally hollow interior or compartment 13. A compartment door 14 coupled to the housing 12 is rotatable relative to the housing 12 to seal the hollow interior of the housing 12. In an embodiment, the door 14 includes at least one detent rod or pawl 16 (see FIG. 2) configured to engage a corresponding actuator 20 mounted to an adjacent surface of the housing 12.

Referring now to FIG. 2-5, an example of an actuator 20 is shown in more detail. As illustrated, the actuator 20 is configured to cinch the compartment door 14 to a fully closed position. In addition, the actuator 20 may also be configured to remotely open the compartment door 14. The compartment actuator 20 includes a motor 22, and in some embodiments, a worm gear 24 driven by a worm 28 mounted to the motor shaft. In an embodiment, the motor 22 is operated in response to a receipt of a signal, operation of a switch, or other equivalent means. A pinion 30 is arranged coaxially with the worm gear 24 such that rotation of the worm gear 24 about an axis X causes a similar rotation of the pinion 30 about the axis X. In the illustrated, non-limiting embodiment, the worm gear 24 and the pinion 30 are integrally formed. However, embodiments where the pinion 30 and the worm gear 24 are separate components are also contemplated herein.

The pinion 30 is arranged in meshing engagement with a drive gear 32 pivotally secured to the actuator 20 or any other suitable location for rotation about an axis Y. The drive gear 32 may be rotatable about its axis Y in a first direction, or alternatively, in both a first direction and a second, opposite direction. In the illustrated non-limiting embodiment, the axis of rotation Y of the drive gear 32 is substantially parallel to the axis of rotation X of the pinion 30 and worm gear 24. A gear reduction may be provided through engagement between the worm 28, worm gear 24, pinion 30, and drive gear 32 such that an appropriate amount of power of the motor 22 is used to rotate the drive gear 32.

The drive gear 32 has a groove 36 formed therein for receiving a detent rod or pawl 16 extending from the compartment door 14. As shown, the groove 36 is eccentric about the axis of rotation Y of the drive gear 32. As a result, rotation of the drive gear 32 about its axis Y causes the pawl 16 received therein to translate inwardly towards a center of the drive gear 32, along an axis oriented substantially perpendicular to the rotational axis Y of the drive gear 32. In an embodiment, best shown in FIG. 3, the surface of the groove 36 has a non-planar configuration. For example a first ramp-like surface 38 may be arranged adjacent the first end 40 of the groove 36 and a second ramp-like surface 42 may be disposed adjacent a second end 44 of the groove 36. In the illustrated, non-limiting embodiment, the first end 40 and the second end 44 of the groove 36 are arranged within a first plane, and a central portion 46 of the groove 36 is arranged within a second plane. The second plane may be oriented substantially parallel to the first plane and is offset therefrom by a distance.

Arranged generally adjacent a side 48 of the drive gear 32, opposite the groove 36, is a switch 50 operably coupled to the motor 22. The switch 50 is configured to cooperate with a feature 52, such as a rib for example, extending from the drive gear 32 to indicate a position of the compartment door 14 to the motor 22. In an embodiment, the switch 50 is activated by engagement with the feature 52 as the drive gear 32 rotates from a first position to a second position, and as the drive gear 32 rotates from the second position to the first position. A first opening 54 and a second opening (not shown) are formed in the feature 52.

Figure 2:
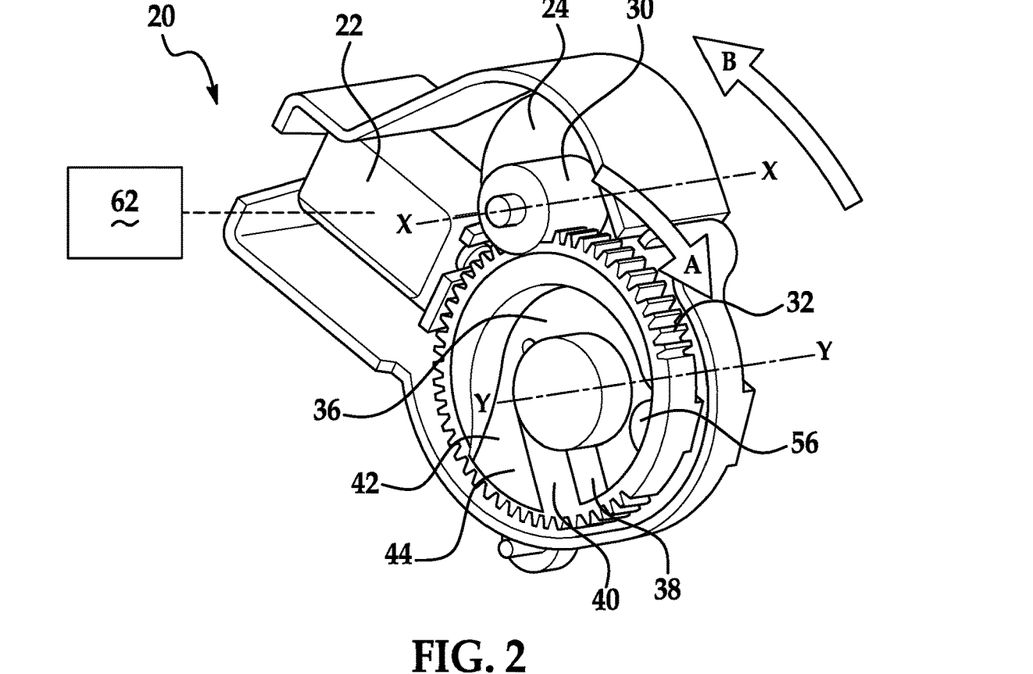
FIG. 2 is a perspective view of a actuator in a starting position according to an embodiment.
Figure 3:
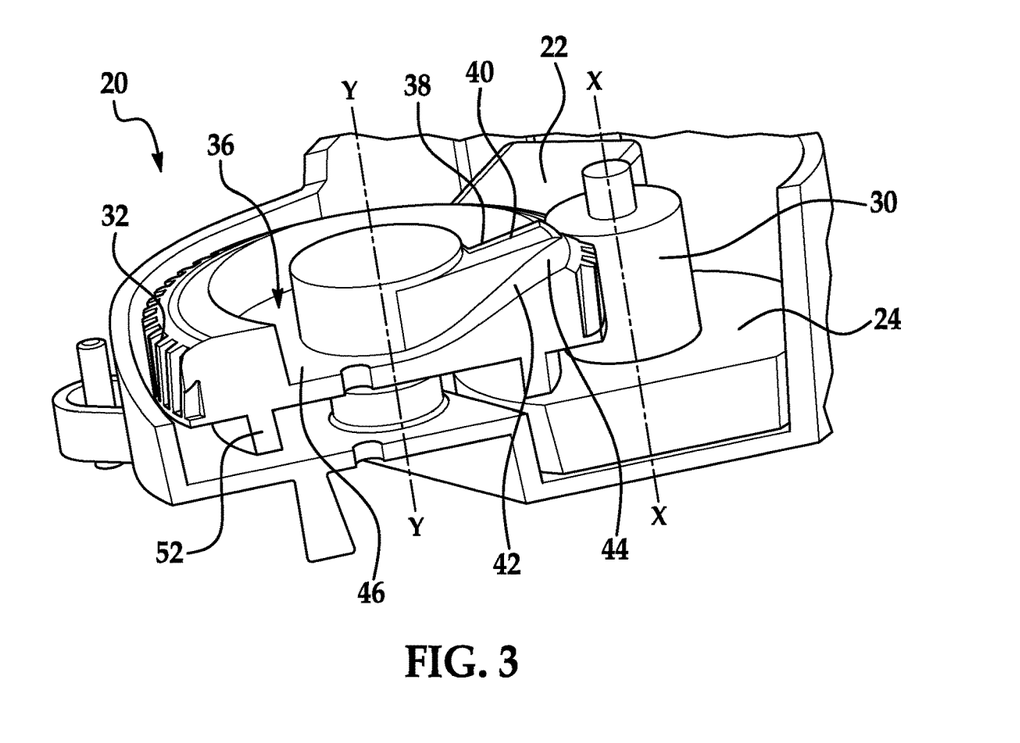
FIG. 3 is a cross-sectional view of portion of an actuator according to an embodiment.
Figure 4:
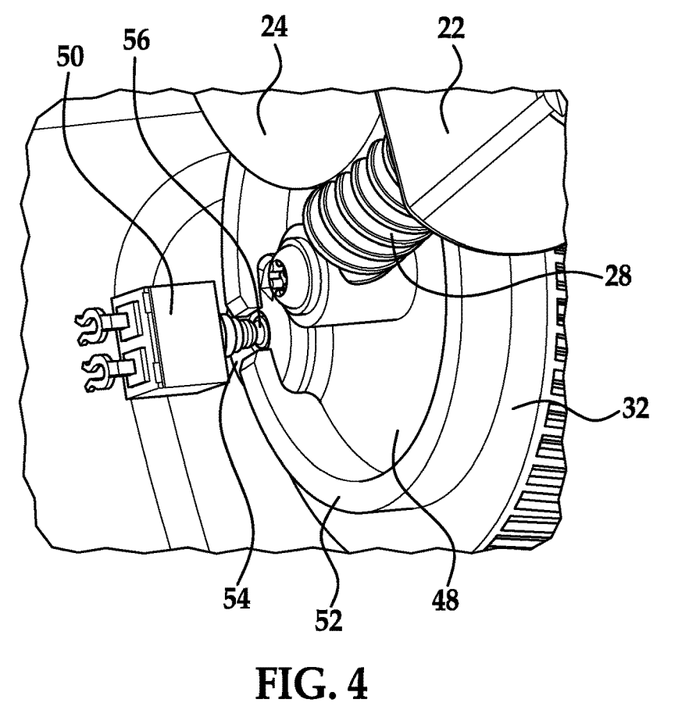
FIG. 4 is a perspective view of a portion of an actuator in a starting position according to an embodiment.
Figure 5:
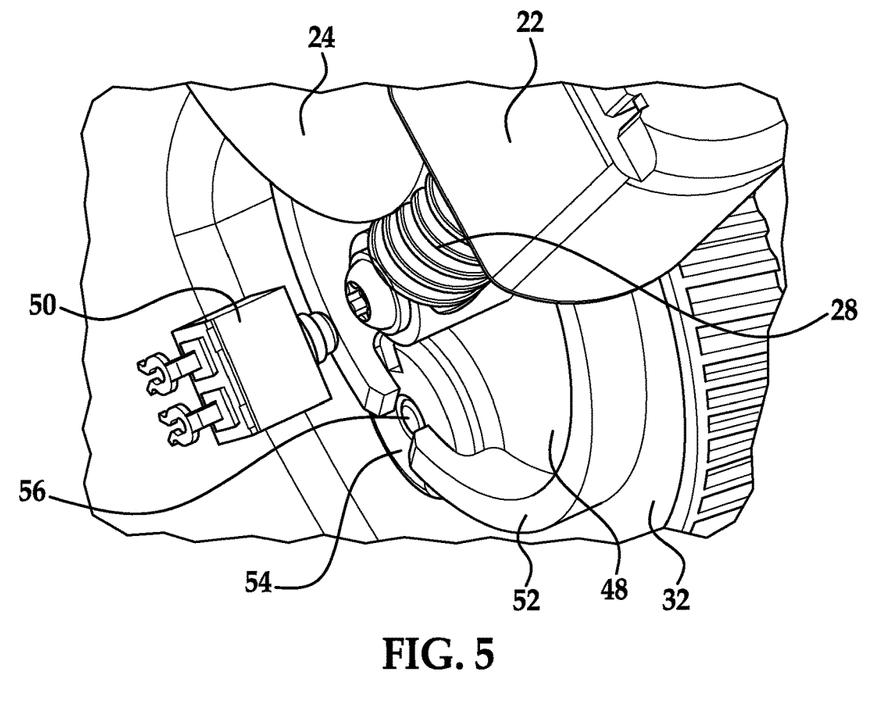
FIG. 5 is a perspective view of a portion of an actuator during movement between a starting position and a fully closed position according to an embodiment.

The drive gear 32 is arranged in a first position, shown in FIG. 2, when the compartment door 14 is open and in a second position (FIG. 9), when the compartment door 14 has been cinched closed by the actuator 20. When the drive gear 32 is in the first position, the switch 50 is aligned with the first opening 54, as shown in FIG. 4, and when the drive gear 32 is in the second position, the switch 50 is positioned within the second opening. In both the first and second positions, the switch 50 is inactive.

An activator pin 56 is coupled to the drive gear 32 such that the activator pin 56 is exposed both within the groove 36 and at the side 48 of the drive gear 32. In an embodiment, the activator pin 56 is spring loaded. When the drive gear 32 is in the first position, the activator pin 56 is generally aligned with the switch 50. Engagement between the pawl 16 and the activator pin 56 when the drive gear 32 is in the first position causes the activator pin 56 to contact and active the switch 50.

Figure 6:
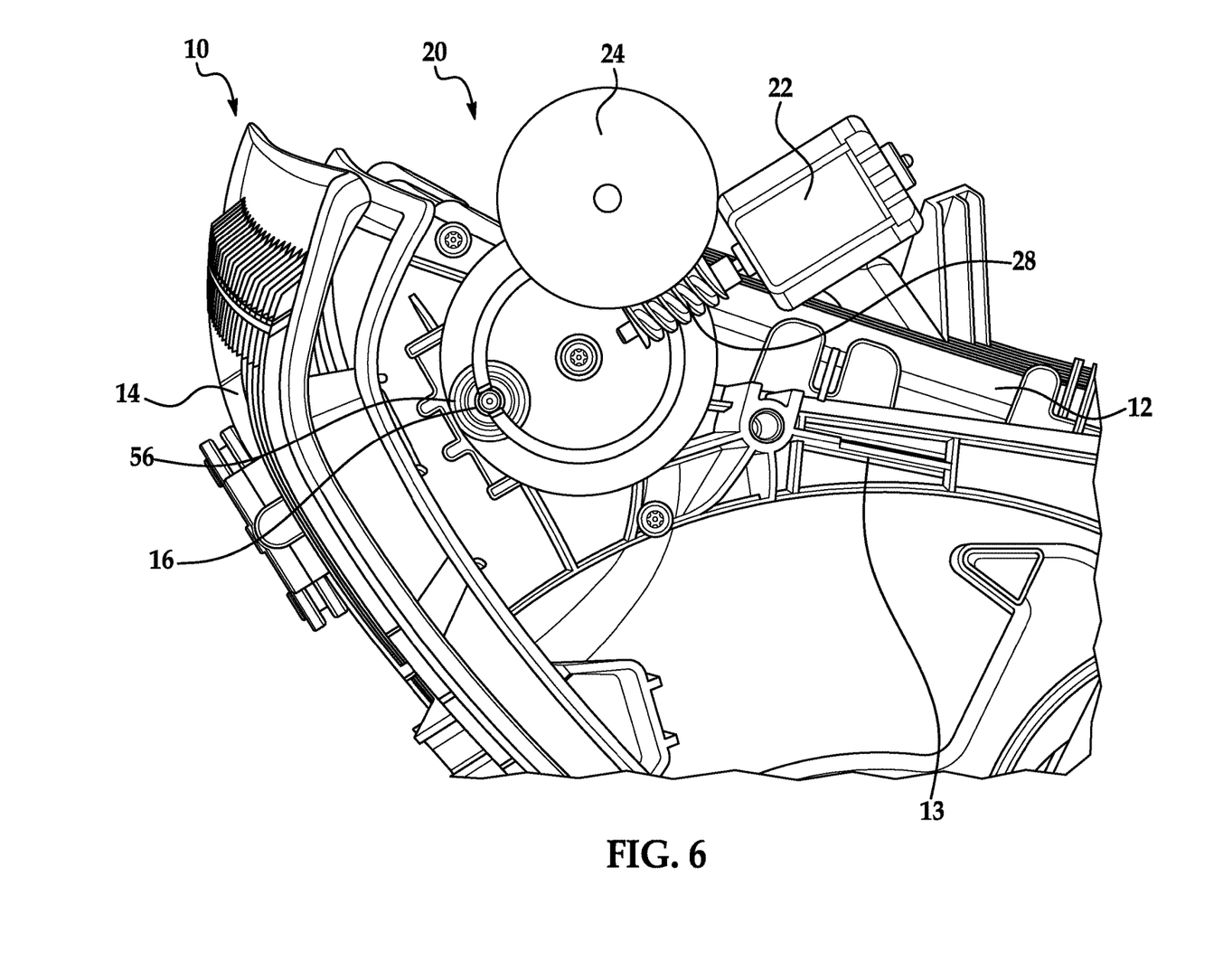
FIG. 6 is a perspective view of an assembly in a pre-closed position according to an embodiment.
Figure 7:
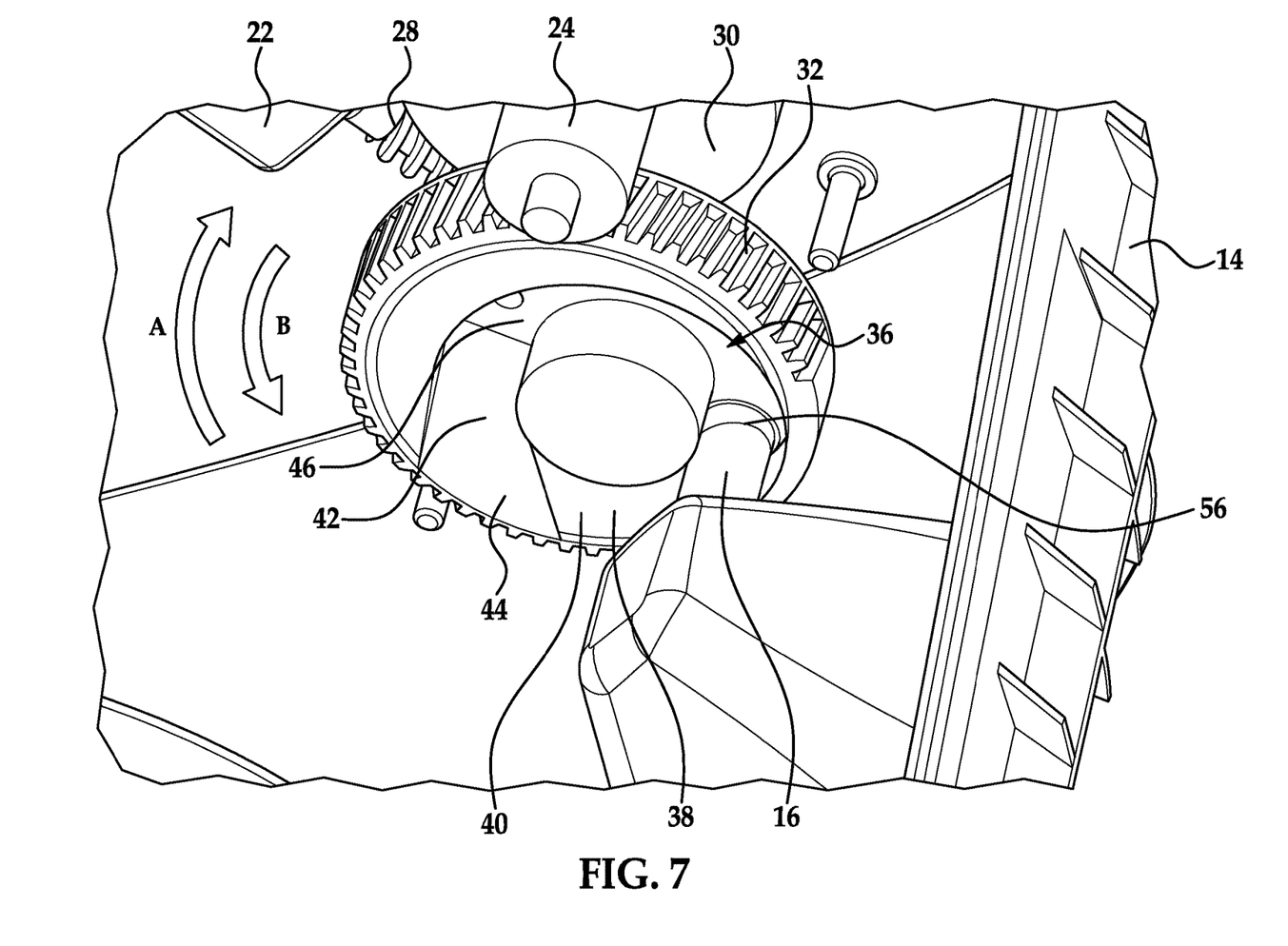
FIG. 7 is a perspective view of the actuator when the compartment door is in a pre-closed position according to an embodiment.

With reference now to FIGS. 6-10, to close the compartment door 14 and seal the compartment of the housing 12, the compartment door 14 is manually rotated from an open position (FIG. 1) to a partially closed position, as shown in FIG. 6. The drive gear 32 of the actuator 20 is arranged within the first position such that the pawl 16 extending from the compartment door 14 is received within the groove 36 of the drive gear 32. As a result, the pawl 16 contacts the activator pin 56 which in turn activates the switch 50. The switch 50 communicates a signal to the motor 22 causing the drive gear 32 to be rotated in a first direction, indicated by arrow A.

Figure 8:
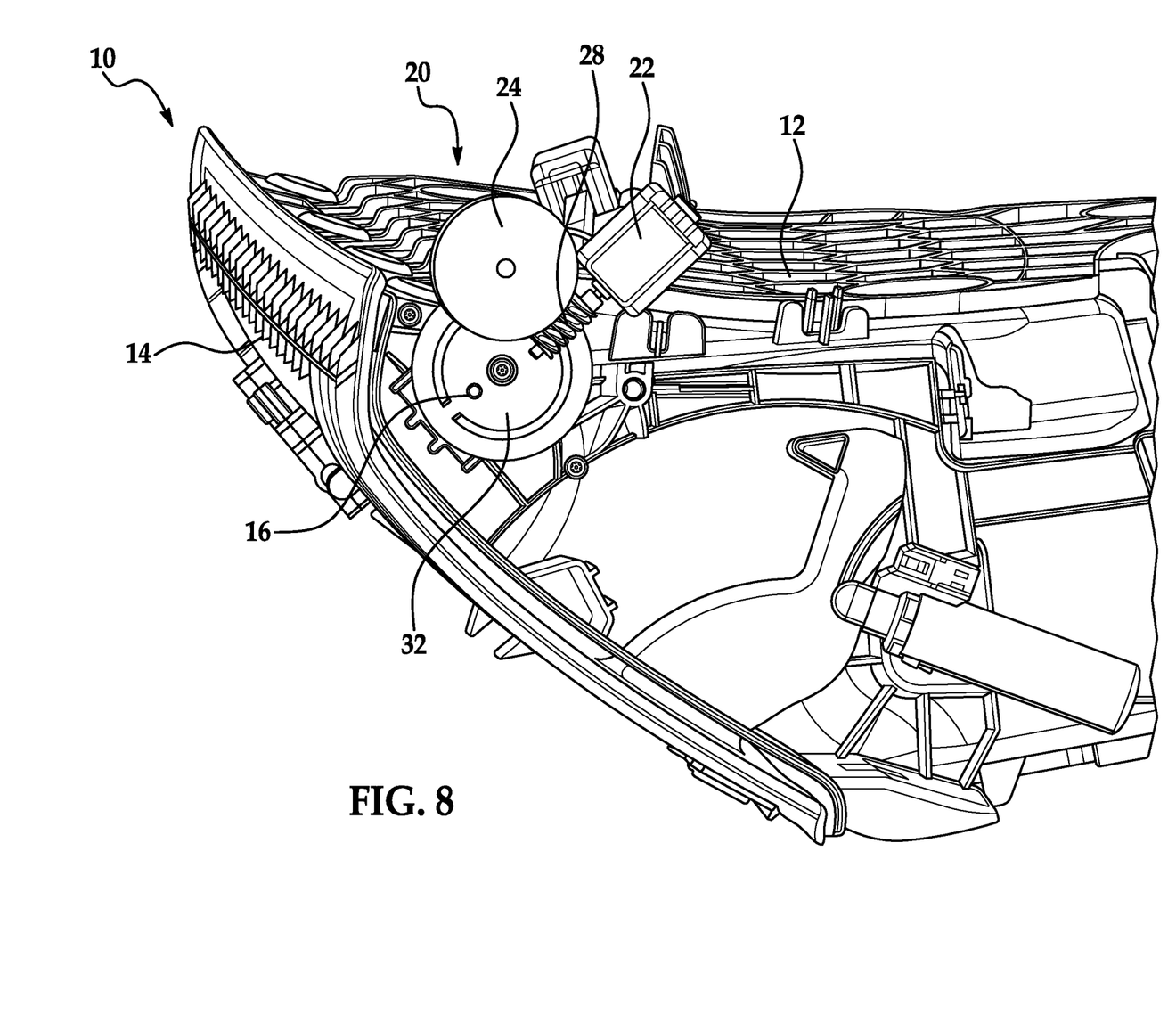
FIG. 8 is a perspective view of a compartment assembly in a fully closed position according to an embodiment.
Figure 9:
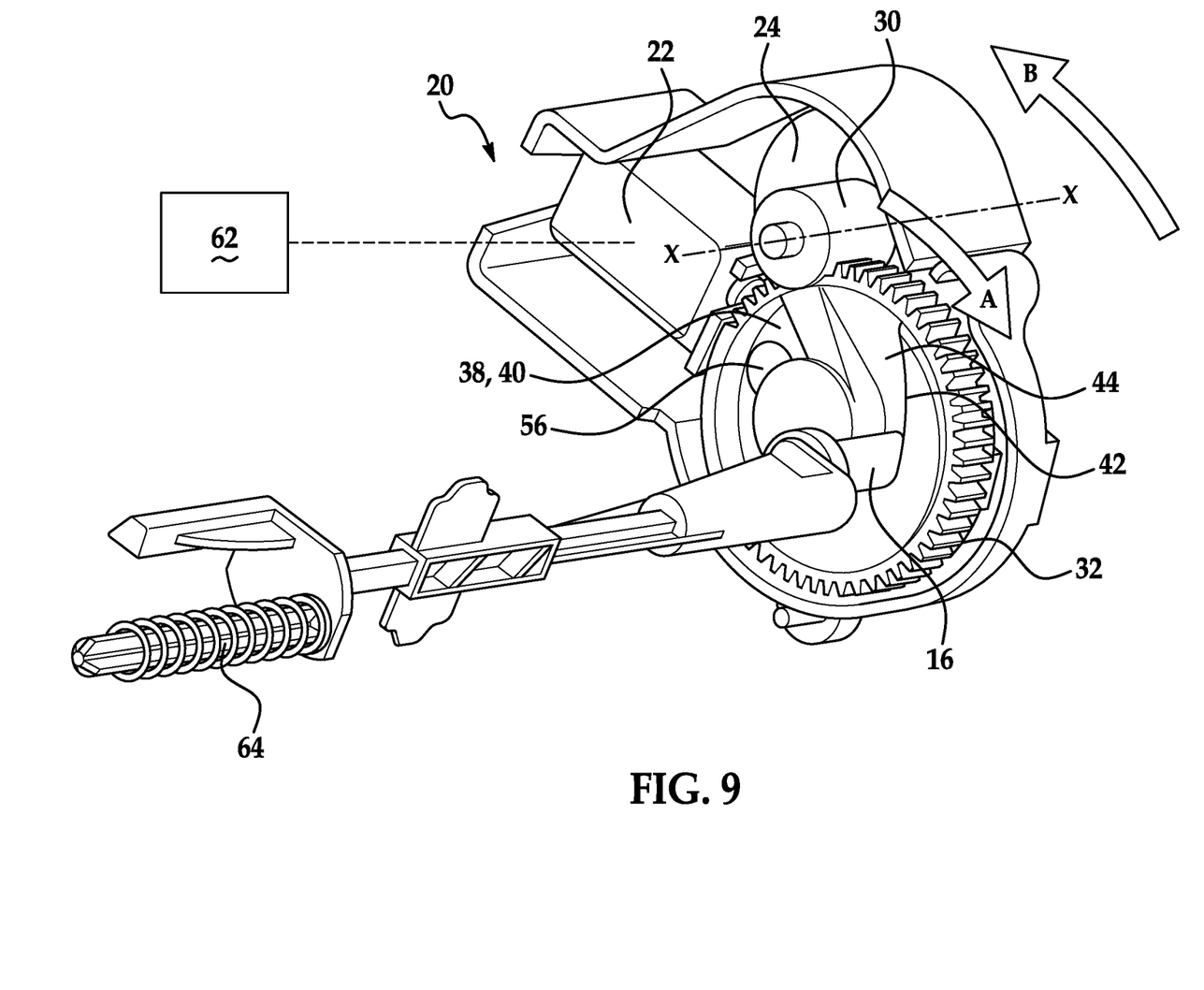
FIG. 9 is a perspective view of the actuator when the compartment door is in the fully closed position according to an embodiment.
Figure 10:
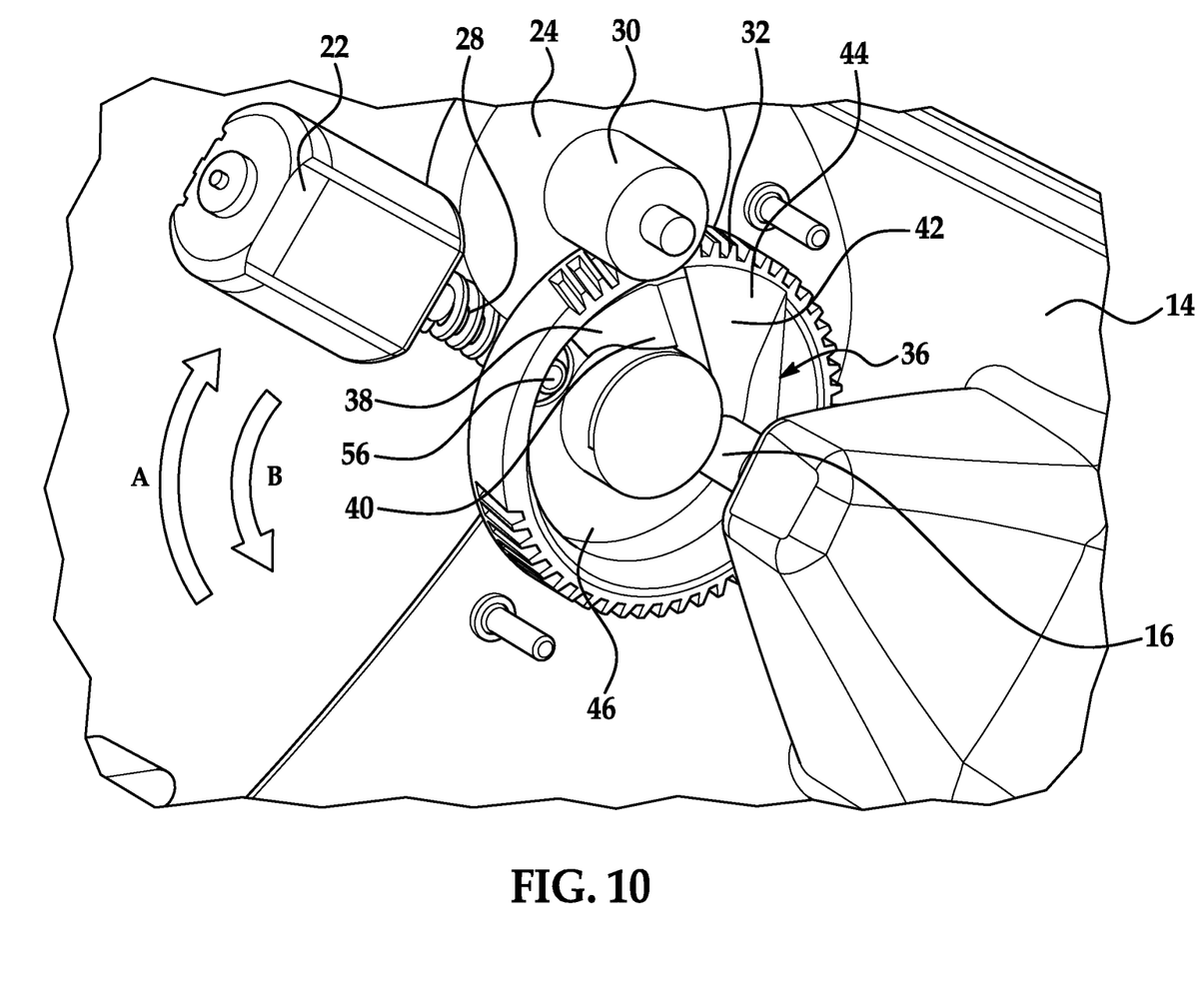
FIG. 10 is another perspective view of the actuator in a fully closed position when the closed compartment door according to an embodiment.

As the drive gear 32 rotates from the first position, the switch 50 engages the feature 52 on the side 48 of the drive gear 32. Operation of the motor 22, and therefore rotation of the drive gear 32, will continue until the switch 50 is deactivated, upon reaching the second opening formed in the feature 50. When the switch is deactivated, the compartment door 14 is in the fully closed position (FIG. 8). During the rotation of the drive gear 32 rotates about its axis Y, the eccentricity of the groove 36 causes the pawl 16 to translate toward a center of the gear 32, as shown in FIGS. 9 and 10, thus causing the compartment door 14 to cinch from the partially closed position to the fully closed position. In an embodiment, the axial translation of the pawl is up to 20 mm.

To open the compartment door 14 relative to the housing 12, a signal is provided to the motor 22 from another switch 62 (see FIG. 2) or other equivalent means. In an embodiment, the switch 62 may be located remotely from the compartment assembly 10. In response to the signal, the motor 22 may rotate the drive gear 32 in the same first direction about axis Y. As the pawl 16 engages the second ramp-like surface 42 of the groove 36, a biasing force of a biasing mechanism 64 (see FIG. 9) acting on the pawl 16 is opposed, causing the pawl 16 to translate out of engagement with the drive gear 32. During rotation of the drive gear 32, the switch 50 engages the feature 52 on the side 48 of the drive gear 32. Operation of the motor 22 continues until the drive gear 32 reaches the first position, and the switch 50 is aligned with the first opening 54 formed in the feature 52.

Alternatively, or in addition, the motor 22 may be operable to rotate the drive gear 32 in a second opposite direction about axis Y, indicated by arrow B to release the compartment door 14. Rotation of the drive gear 32 in the second direction may be used in response to a failure of the actuator 20, such as during interruption of a closing operation. In such embodiments, the pawl 16 contacts the first ramp-like surface 38 of the groove 36, which opposes the biasing force of the biasing mechanism 64 acting on the pawl 16. The first ramp-like surface 38 gradually moves the pawl 16 out of engagement with the drive gear 32 to release the pawl 16 from the actuator 20. As the drive gear 32 rotates from the second position, the switch 50 engages the feature 52 on the second side 48 of the drive gear 32. Operation of the motor 22 continues until the drive gear 32 reaches the first position, and the switch 50 is aligned with the first opening 54 formed in the feature 52.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A compartment actuator comprising:
   a pawl;
   a motor; and
   a drive gear driven by the motor about an axis of rotation between a first position and a second position, the drive gear having a curved groove for receiving a pawl, the pawl being movable out of engagement with the drive gear, the groove has a first end and a second end connected by a central portion, and at least one of the first end and the second end includes at least one ramp-like surface extending relative to the axis of rotation for opposing a biasing force acting on the pawl, wherein the groove is eccentric about the axis of rotation such that a radial distance between the groove and the axis of rotation varies about the groove; and
   wherein when the drive gear is in the first position, the pawl is receivable at one of the first end and the second end of the groove and when the drive gear is in the second position, the pawl is arranged within the central portion of the groove.

2. The compartment actuator of claim 1, wherein as the drive gear rotates between the first position and the second position, the pawl receivable within the groove translates along a pawl axis relative to the drive gear.

3. The compartment actuator of claim 2, wherein the pawl axis is substantially perpendicular to the axis of rotation of the drive gear.

4. The compartment actuator of claim 2, wherein as the drive gear rotates from the first position to the second position, the pawl translates inwardly toward a center of the drive gear.

5. The compartment actuator of claim 2, wherein the pawl translates about up to 20 mm.

6. The compartment actuator of claim 1, further comprising:
   a switch for communicating with the motor; and
   a feature extending from the drive gear, wherein the feature engages and activates the switch as the drive gear rotates between the first position and the second position.

7. The compartment actuator of claim 6, wherein the feature does not engage the switch when the drive gear is in the first position and the second position.

8. The compartment actuator of claim 6, further comprising an activator pin coupled to the drive gear, wherein the activator pin and the switch are aligned when the drive gear is in the first position, the switch being operable by the pawl via the activator pin.

9. The compartment actuator of claim 6, further comprising a secondary switch for communicating to the motor a signal to rotate the drive gear from the second position to the first position, the secondary switch being located remotely from the compartment actuator.

10. The compartment actuator of claim 1, wherein the first position of the drive gear is associated with a partially closed position of a compartment door and the second position of the drive gear is associated with a fully closed position of the compartment door.

11. The compartment actuator of claim 1, wherein the drive gear is rotatable between a first position and a second position in a first direction about the axis of rotation.

12. The compartment actuator of claim 11, wherein the drive gear is rotatable from a second position to a first position in the first direction and a second opposite direction about the axis of rotation.

13. The compartment actuator of claim 11, wherein the drive gear is rotatable in a second direction about the axis of rotation in response to a failure of the actuator.

* * * * *